US009714600B2

(12) United States Patent
Kwon et al.

(10) Patent No.: US 9,714,600 B2
(45) Date of Patent: Jul. 25, 2017

(54) SYSTEM AND METHOD FOR REDUCING HARMFUL SUBSTANCES OF SHIP AND SHIP USING THE SAME

(71) Applicant: HYUNDAI HEAVY INDUSTRIES CO., LTD., Ulsan (KR)

(72) Inventors: Young Woo Kwon, Ulsan (KR); Ju Seog Han, Ulsan (KR); Nam Gi Park, Ulsan (KR); Jung Dae Yu, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 18 days.

(21) Appl. No.: 14/897,178

(22) PCT Filed: Mar. 24, 2015

(86) PCT No.: PCT/KR2015/002868
§ 371 (c)(1),
(2) Date: Dec. 9, 2015

(87) PCT Pub. No.: WO2015/147521
PCT Pub. Date: Oct. 1, 2015

(65) Prior Publication Data
US 2016/0144942 A1    May 26, 2016

(30) Foreign Application Priority Data

Mar. 25, 2014  (KR) .................. 10-2014-0034769
Mar. 6, 2015   (KR) .................. 10-2015-0031390
Mar. 6, 2015   (KR) .................. 10-2015-0031877

(51) Int. Cl.
G01S 19/14   (2010.01)
B63H 21/32   (2006.01)
(Continued)

(52) U.S. Cl.
CPC ........... *F01N 13/004* (2013.01); *B63H 21/21* (2013.01); *B63H 21/32* (2013.01); *B63J 4/00* (2013.01);
(Continued)

(58) Field of Classification Search
CPC ........ B63H 21/32; G01S 19/14; F01N 13/004
(Continued)

(56) References Cited

U.S. PATENT DOCUMENTS 4,804,523 A  *  2/1989  Abrams ............... B01D 53/501
                                                423/243.08
6,212,883 B1 *  4/2001  Kang .................... F01N 3/0892
                                                    204/176
(Continued)

FOREIGN PATENT DOCUMENTS

CN          101590906 A    12/2009
EP          2332826 A1     6/2011
(Continued)

OTHER PUBLICATIONS

PCT International Search Report dated Jun. 9, 2015, in International App. No. PCT/KR2015/002868 (4 pp.) (English and Korean).

*Primary Examiner* — Tan Q Nguyen
(74) *Attorney, Agent, or Firm* — Dinesh Agarwal, P.C.

(57) ABSTRACT

A ship comprises: a hull; an engine for propelling the hull; a harmful substance reducing device for reducing harmful substances included in exhaust gas discharged from the engine; and a preheating device for the harmful substance reducing device, preliminarily heating the harmful substance reducing device when the hull is located at an emission control area (ECA) preliminary entry point close to an ECA in which the emission of the harmful substances is restricted. The ship comprises: the hull; the engine for propelling the hull; the harmful substance reducing device for reducing the
(Continued)

harmful substances included in the exhaust gas discharged from the engine; and an engine output control device for controlling the output of the engine to be lowered so as to reduce the amount of the exhaust gas discharged from the engine when the hull is located in the ECA or at the ECA preliminary entry point.

19 Claims, 9 Drawing Sheets

(51) Int. Cl.
    *F01N 13/00*      (2010.01)
    *F01N 3/20*      (2006.01)
    *B63J 4/00*      (2006.01)
    *F02D 41/02*      (2006.01)
    *B63H 21/21*      (2006.01)

(52) U.S. Cl.
    CPC ........... *F01N 3/2006* (2013.01); *F01N 3/208* (2013.01); *F01N 3/2066* (2013.01); *F02D 41/027* (2013.01); *G01S 19/14* (2013.01); *F01N 2590/02* (2013.01); *F01N 2610/02* (2013.01); *F02D 2200/701* (2013.01); *F02D 2250/26* (2013.01); *Y02T 10/24* (2013.01); *Y02T 10/26* (2013.01)

(58) Field of Classification Search
    USPC ........... 701/21, 103, 108; 210/747, 760, 192
    See application file for complete search history.

(56) References Cited

U.S. PATENT DOCUMENTS

| | | | | |
|---|---|---|---|---|
| 9,216,376 | B2* | 12/2015 | Liu | ................ B01D 53/501 |
| 2004/0099608 | A1* | 5/2004 | Leffler | ................ C02F 1/4672 |
| | | | | 210/704 |
| 2013/0218377 | A1 | 8/2013 | Murata et al. | |

FOREIGN PATENT DOCUMENTS

| | | |
|---|---|---|
| EP | 2610454 A1 | 7/2013 |
| EP | 2634082 A1 | 9/2013 |
| JP | 11-271272 A | 10/1999 |
| JP | 2009-286389 | 12/2009 |
| JP | 2010-069999 A | 4/2010 |
| JP | 2012-098801 | 5/2012 |
| JP | 2013-100834 A | 5/2013 |
| JP | 2013-130109 | 7/2013 |
| KR | 10-2009-0124930 | 12/2009 |
| KR | 10-2010-0132310 | 12/2010 |
| KR | 10-2012-0042107 | 5/2012 |
| KR | 10-2013-0082156 | 7/2013 |
| KR | 10-2013-0115504 | 10/2013 |
| KR | 10-2013-0127737 | 11/2013 |
| KR | 10-2014-0046651 | 4/2014 |
| WO | WO2012/026432 A1 | 3/2012 |

\* cited by examiner

【Fig. 1】
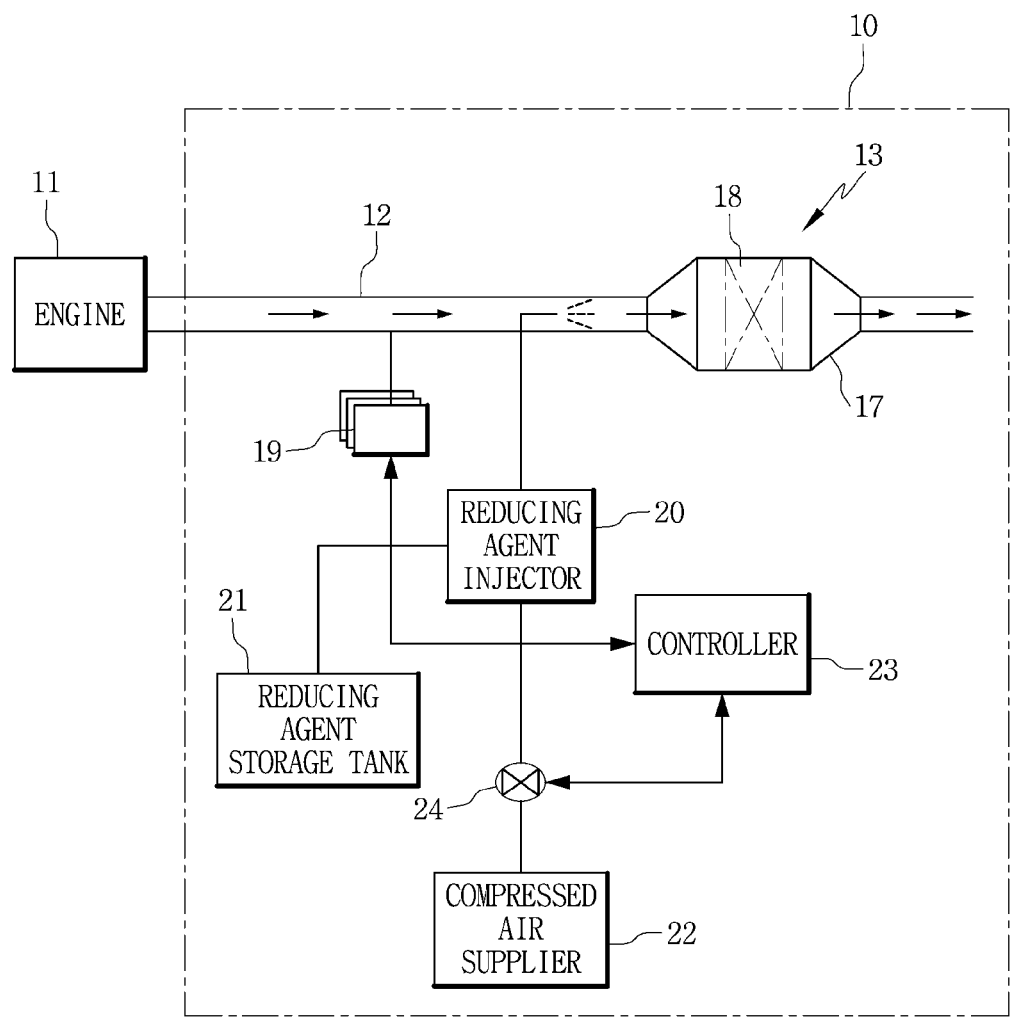

[Fig. 2]
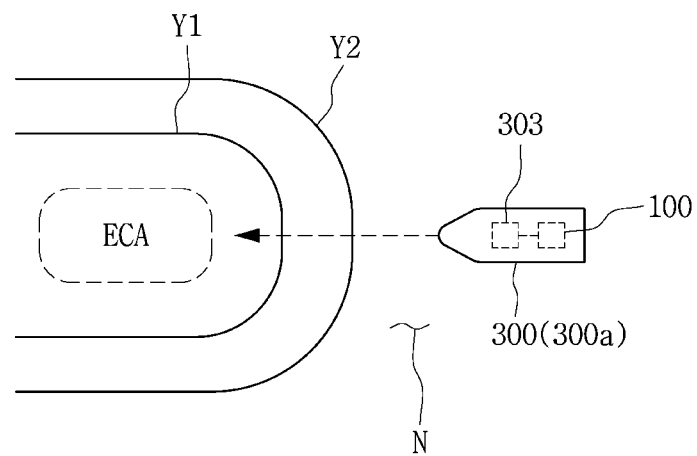

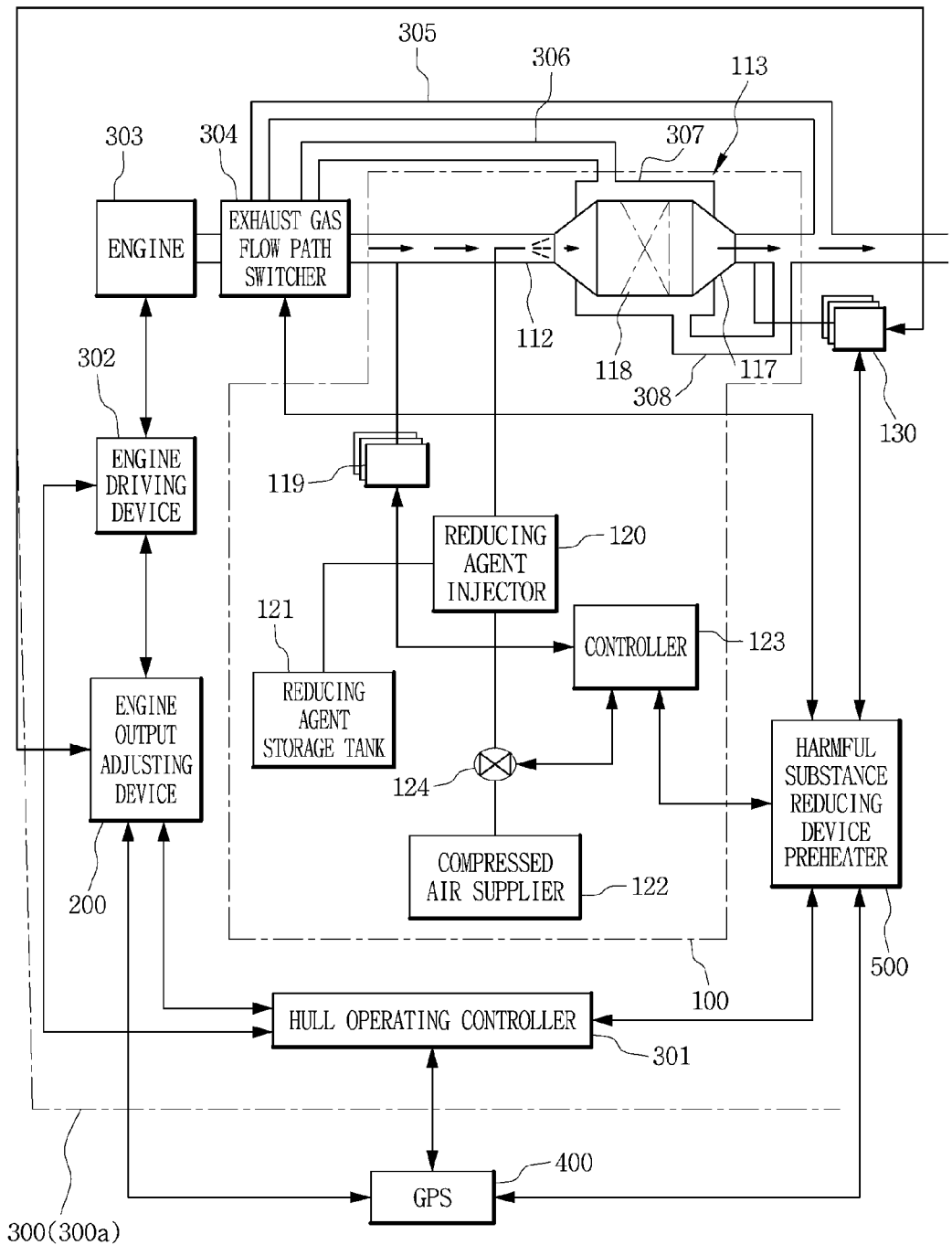
[Fig. 3]

[Fig. 4]
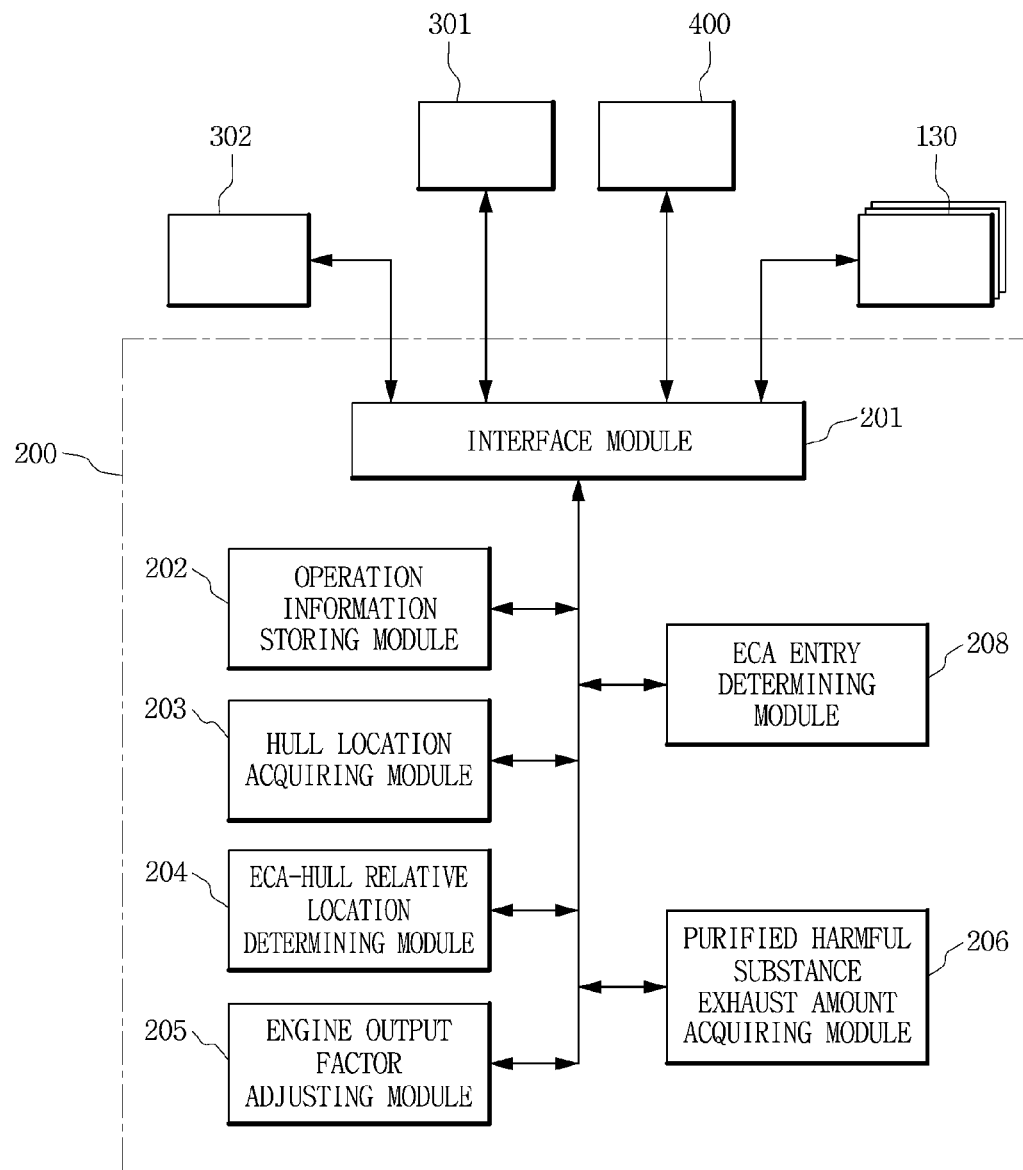

【Fig. 5】
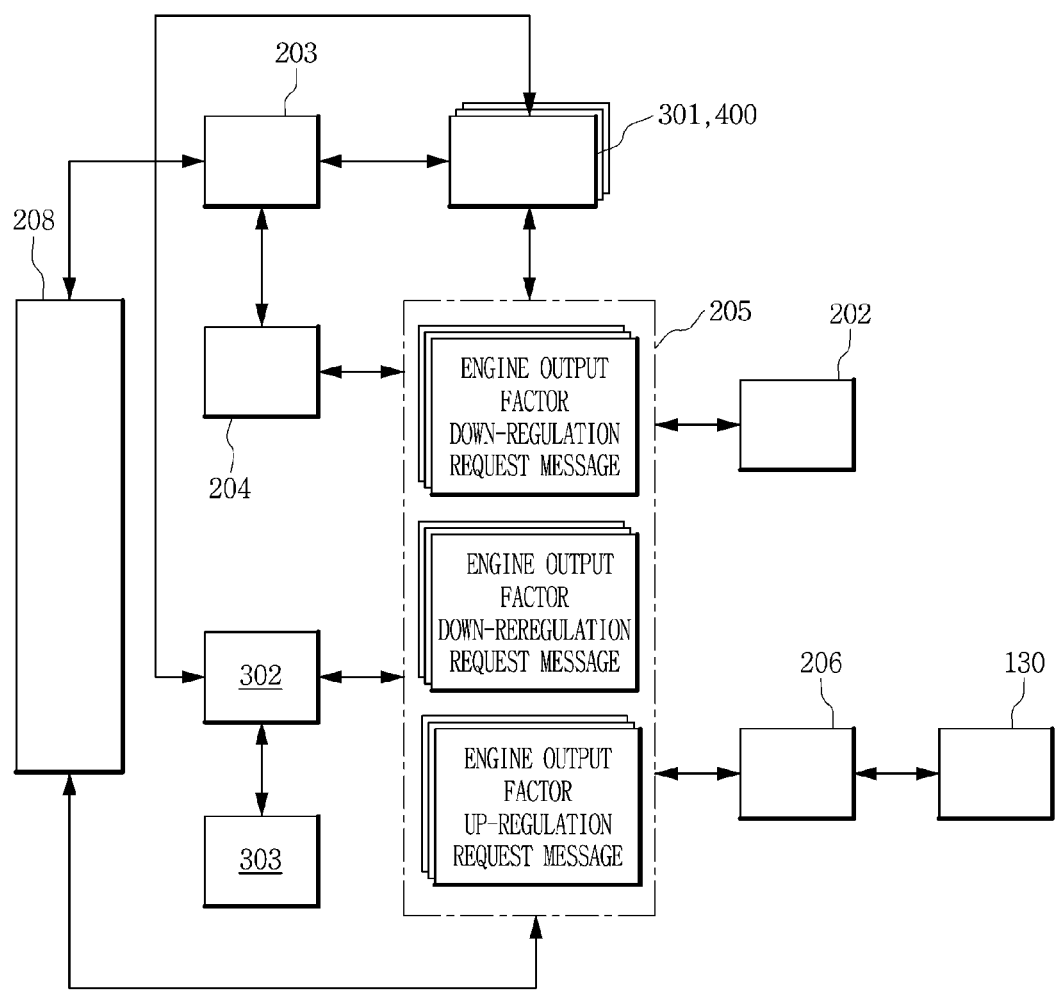

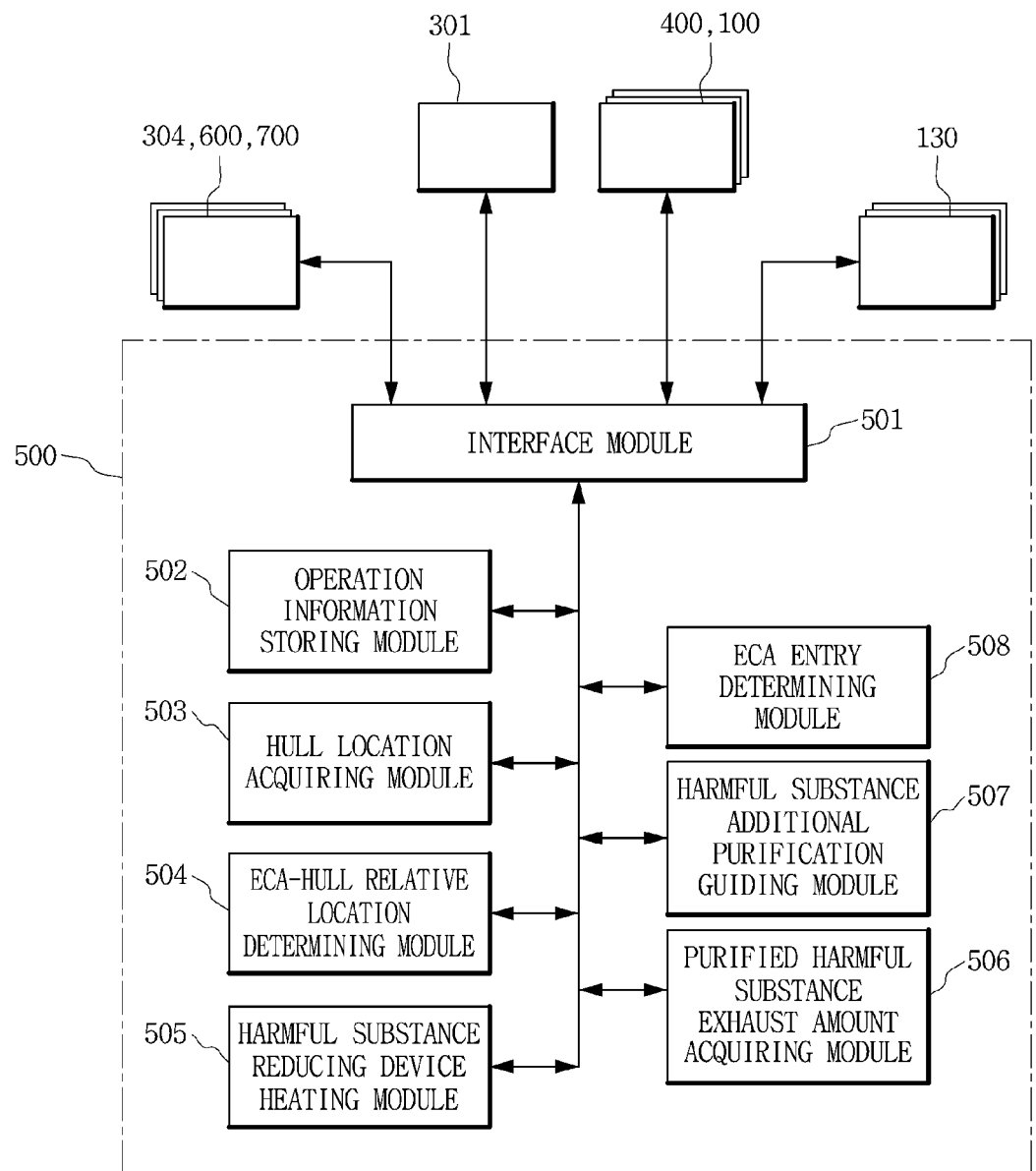
[Fig. 6]

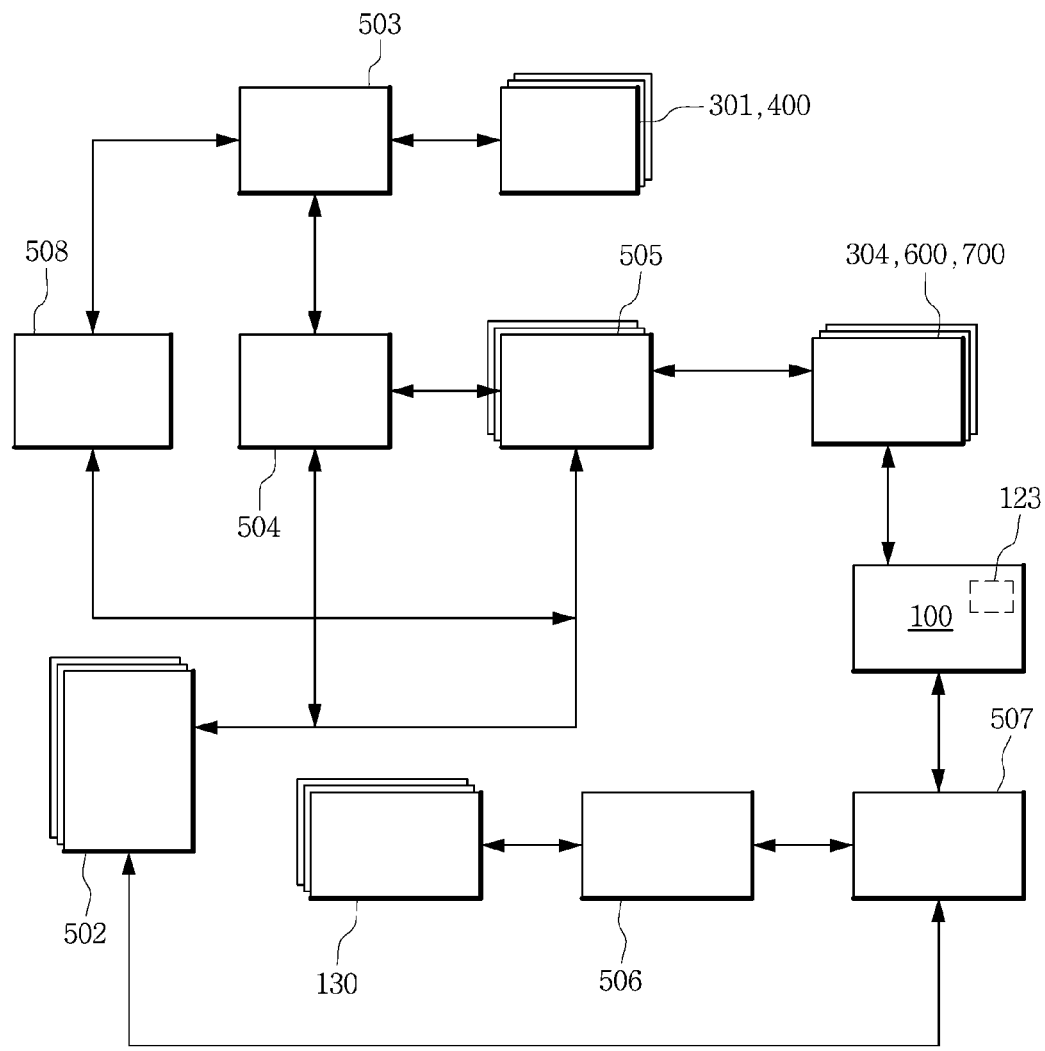
[Fig. 7]

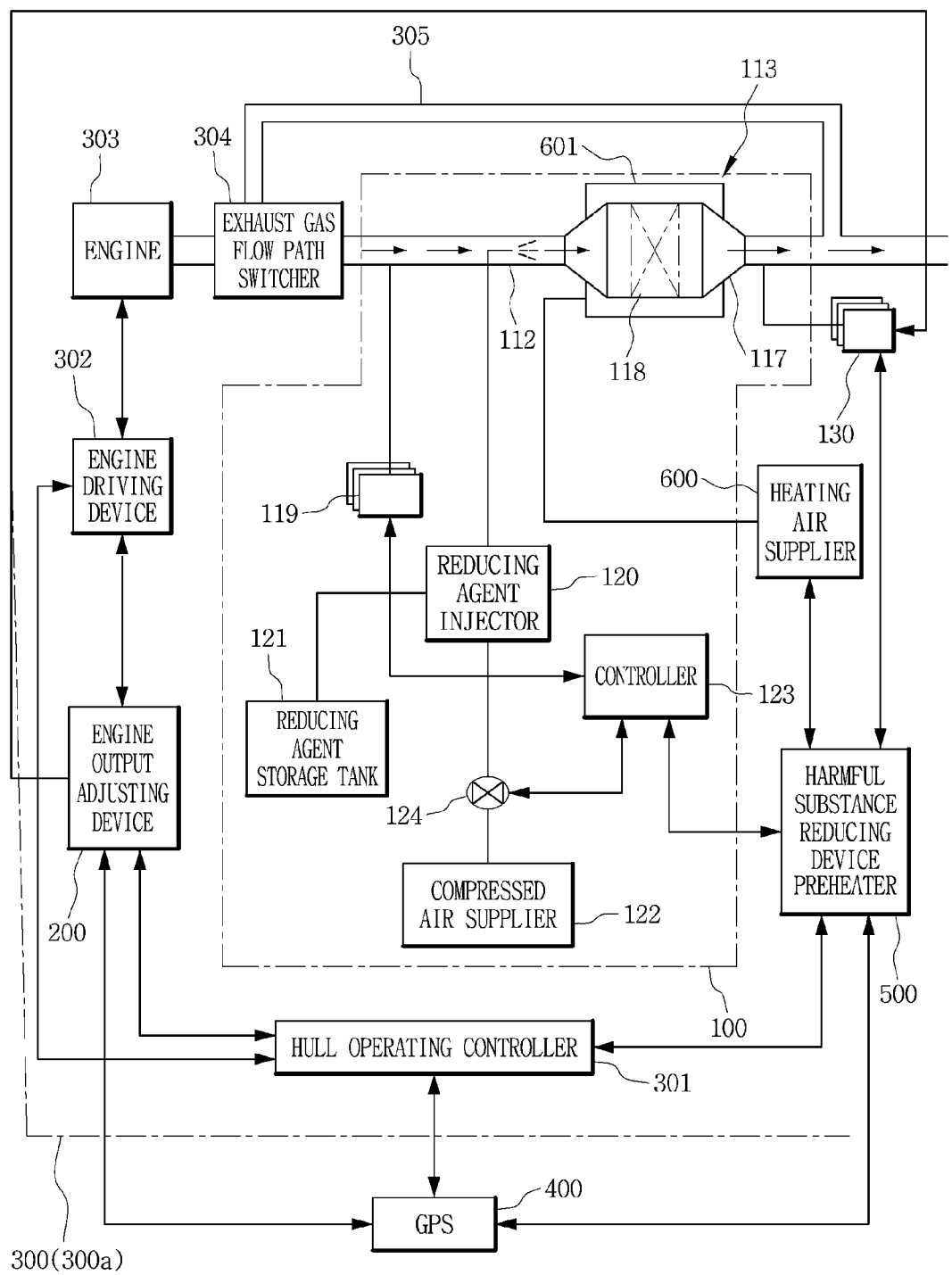
[Fig. 8]

[Fig. 9]
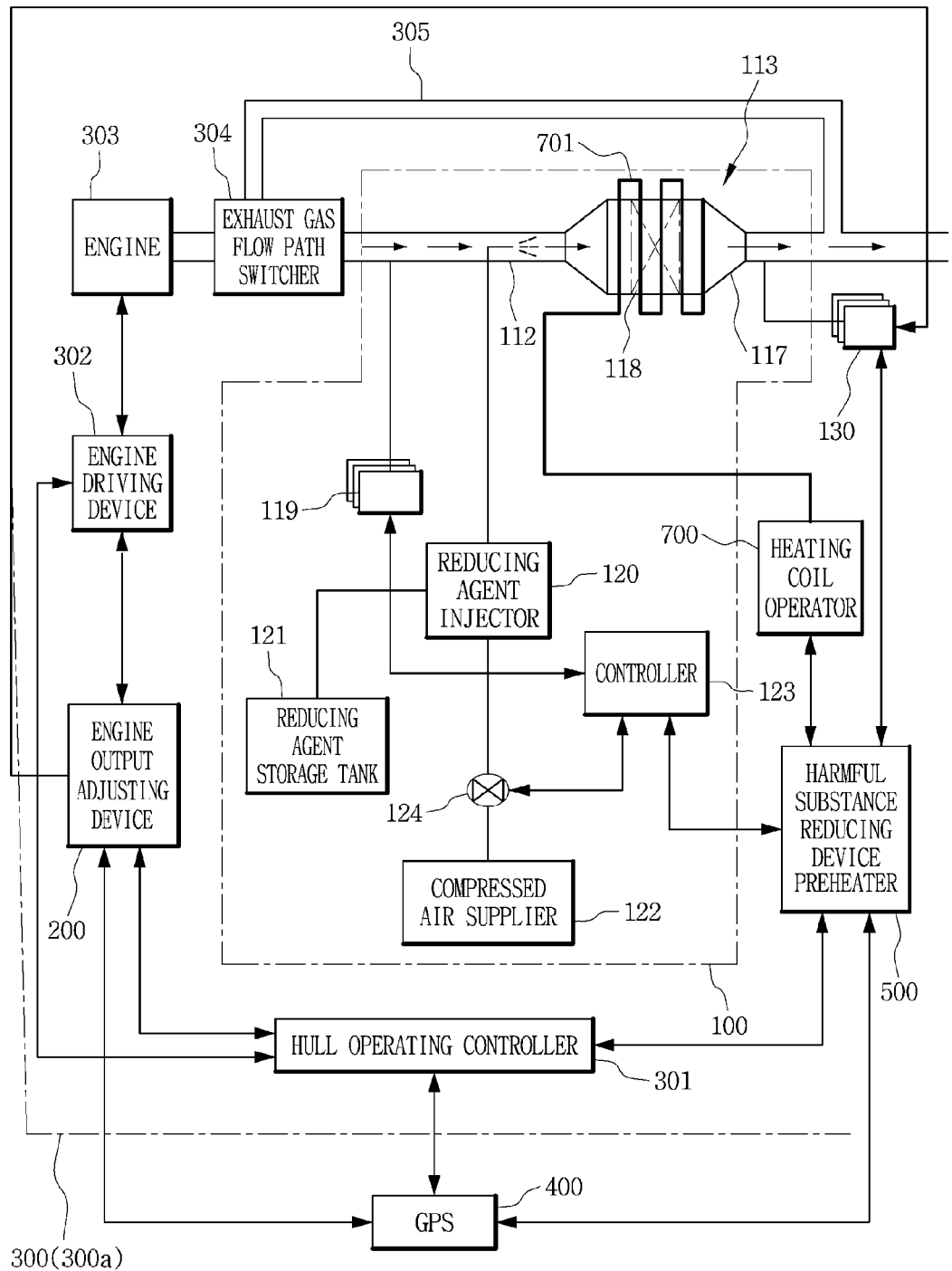

US 9,714,600 B2

SYSTEM AND METHOD FOR REDUCING HARMFUL SUBSTANCES OF SHIP AND SHIP USING THE SAME

CROSS-REFERENCE TO RELATED APPLICATIONS

This application is the U.S. National Stage of International Patent Application No. PCT/KR2015/002868, filed Mar. 24, 2015, which claims priority to Korean Patent Application No. 10-2014-0034769 filed Mar. 25, 2014, Korean Patent Application No. 10-2015-0031390 filed Mar. 6, 2015, and Korean Patent Application No. 10-2015-0031877 filed Mar. 6, 2015, all of which are hereby incorporated herein in their entirety by reference.

TECHNICAL FIELD

The present disclosure relates to a system for reducing harmful substances of a ship, a control method therefor, and a ship using the same. More particularly, the present disclosure relates to a system for reducing harmful substances of a ship, a control method therefor, and a ship using the same, in which <a computing module for down-regulating various output factors of an engine to minimize an amount of exhaust gas discharged from the engine, when a ship is located in an emission control area (ECA) where discharge of harmful substances is strictly prohibited or at an ECA preliminary entry point>, <a computing module for preheating a harmful substance reducing device when the ship is located at an ECA preliminary entry point so that the corresponding harmful substance reducing device is guided to function instantly (namely, at a point when a hull of the ship enters the ECA)> or the like is systematically arranged in a communication pipeline such as a hull operating controller taking charge of operating the hull, an engine driving device taking charge of operating the engine, or the like.

BACKGROUND ART

Recently, harmful substances, for example nitrogen oxide ($NO_x$), discharged from a ship become more strictly prohibited (for reference, TierIII which is to be effective in 2016 is scheduled to regulate the discharge of nitrogen oxide below 3.4 g/KW (in case of less than rpm 130)), and thus various kinds of harmful substance reducing devices for ship utilizing a selective catalyst reduction (SCR) technique or the like are being widely developed and propagated.

For example, Korean Unexamined Patent Publication No. 10-2010-132310 (entitled "a SCR system for a ship using urea powder and nitrogen oxide reducing method") (published on Dec. 17, 2010), Korean Unexamined Patent Publication No. 10-2013-127737 (entitled "an apparatus for preventing a SCR device from being clogged with waste heat of a ship") (published on Nov. 25, 2013), Korean Unexamined Patent Publication No. 10-2014-46651 (entitled "a denitriding apparatus of a large engine for a ship") (published on Apr. 21, 2014) or the like disclose more detailed configurations of existing harmful substance reducing devices for ship.

Meanwhile, as shown in FIG. 1, an existing harmful substance reducing device 10, for example a nitrogen oxide reducing device, is configured so that an exhaust gas flow line 12 drawn from an engine 11, a reducing agent storage tank 21 for storing a reducing agent (for example, urea) for reducing harmful substances, for example nitrogen oxide ($NO_x$), a reducing agent injector 20 connected to the reducing agent storage tank 21 to inject the reducing agent (for example, urea) stored in the reducing agent storage tank 21 to the exhaust gas flow line 12, a compressed air supplier 22 for supplying a compressed air so that the reducing agent injector 20 may easily perform a series of reducing agent injecting functions, a controller 23 for controlling a compressed air supply valve 24 based on a measurement value output from sensors 19 to adjust an amount of reducing agent injected by the reducing agent injector 20, and a SCR reactor 13 connected to the engine 11 through the exhaust gas flow line 12 to allow an exhaust gas and a reducing agent to pass together so as to purify harmful substances (for example, nitrogen oxide ($NO_x$)) contained in the exhaust gas are systematically combined.

At this time, the SCR reactor 13 allows the exhaust gas and the reducing agent to pass simultaneously so that the nitrogen oxide ($NO_x$) reacts with the reducing agent, and is configured so that a SCR catalyst 18 for reducing the corresponding nitrogen oxide ($NO_x$) into nitrogen and steam harmless to living things and a SCR chamber 17 accommodating the SCR catalyst 18 are combined.

Under such an existing system, if the output of the engine 11 increases, the scale of the harmful substance reducing device 10 inevitably increases proportionally. This is because, if the output of the engine 11 increases, an amount of exhaust gas generated from the corresponding engine 11 inevitably increases.

However, there are many limits in increasing the scale of the harmful substance reducing device 10 in proportion to the output of the engine 11. This is because, if the scale of the harmful substance reducing device 10 increases, various problems such as deteriorated space utilization of a ship, impossible overland transportation of the large harmful substance reducing device 10, impossible enlargement of various valves or the like occur.

If the enlargement of scale of the harmful substance reducing device 10 is restricted as above, a ship operator inevitably has great difficulty in purifying harmful substances generated from the engine 11 and should bear tangible or intangible damages resulting therefrom.

DISCLOSURE

Technical Problem

The present disclosure is directed to systematically arranging <a computing module for down-regulating various output factors of an engine to minimize an amount of exhaust gas discharged from the engine, when a ship is located in an emission control area (ECA) where discharge of harmful substances is strictly prohibited or at an ECA preliminary entry point>, <a computing module for preheating a harmful substance reducing device when the ship is located at an ECA preliminary entry point so that the corresponding harmful substance reducing device is guided to function instantly (namely, at a point when a hull of the ship enters the ECA)> or the like in a communication pipeline such as a hull operating controller taking charge of operating the hull, an engine driving device taking charge of operating the engine, or the like Also, the present disclosure is directed to allowing a harmful substance reducing device to be in a fully heated state which allows normal operations so as to perform a series of harmful substance reducing functions only for an exhaust gas of an engine (or, a minimum amount of harmful substances of the engine) instantly after a hull initiates ECA sailing, so that a ship operator may flexibly cope with recent harmful substance restrictions without enlarging the scale of the harmful substance reducing device (namely, in a state where the harmful substance reducing device has a small size), and it is also possible to easily avoid serious problems caused when harmful substances contained in the exhaust gas are not normally purified due to malfunction of the harmful substance reducing device.

Other objects of the present disclosure will be more apparent from the following detailed description and the accompanying drawings.

Technical Solution

In one general aspect, the present disclosure provides a ship, which includes: a hull; an engine configured to propelling the hull; a harmful substance reducing device configured to reduce harmful substances contained in an exhaust gas discharged from the engine; and a harmful substance reducing device preheater configured to preheating the harmful substance reducing device when the hull is located at an emission control area (ECA) preliminary entry point adjacent to an ECA where discharge of harmful substances is prohibited.

In another aspect, the present disclosure provides a harmful substance reducing device preheater loaded on a hull including an engine and a harmful substance reducing device, which includes: a hull location acquiring module configured to communicate with a global positioning system (GPS) or a hull operating controller for operating the hull to acquire location information of the hull; an ECA-hull relative location determining module configured to compare the location information of the hull with stored location information of the ECA to determine whether the hull is located at an ECA preliminary entry point adjacent to the ECA; and a harmful substance reducing device heating module configured to communicate with a heat supply unit connected to the harmful substance reducing device and preheat the harmful substance reducing device, when the hull is located at the ECA preliminary entry point.

In another aspect, the present disclosure provides a method for preheating a harmful substance reducing device loaded on a hull having an engine, which includes: acquiring location information of the hull; comparing the location information of the hull with stored location information of an emission control area (ECA) to determine whether the hull is located at an ECA preliminary entry point adjacent to the ECA; and preheating the harmful substance reducing device, when the hull is located at the ECA preliminary entry point.

In another aspect, the present disclosure provides a ship, which includes: a hull; an engine configured to propelling the hull; a harmful substance reducing device configured to reduce harmful substances contained in an exhaust gas discharged from the engine; and an engine output adjusting device configured to down-regulating an output of the engine to reduce an amount of exhaust gas discharged from the engine, when the hull is located in an emission control area (ECA) where discharge of harmful substances is prohibited or at an ECA preliminary entry point.

In another aspect, the present disclosure provides an engine output adjusting device loaded on a hull including an engine and a harmful substance reducing device, which includes: a hull location acquiring module configured to communicate with a global positioning system (GPS) or a hull operating controller for operating the hull to acquire location information of the hull; an ECA-hull relative location determining module configured to compare the location information of the hull with stored location information of an emission control area (ECA) to determine whether the hull is located in the ECA or at the ECA preliminary entry point; and an engine output factor adjusting module configured to communicate with the hull operating controller or an engine driving device for operating the engine to down-regulate an engine output factor related with the output of the engine so that an amount of exhaust gas discharged from the engine decreases, when the hull is located in the ECA or at the ECA preliminary entry point.

In another aspect, the present disclosure provides a method for controlling an output of an engine loaded on a hull including a harmful substance reducing device, which includes: acquiring location information of the hull; comparing the location information of the hull with stored location information of an emission control area (ECA) to determine whether the hull is located in the ECA or at an ECA preliminary entry point; and down-regulating an engine output factor related with an output of the engine to reduce an amount of exhaust gas discharged from the engine, when the hull is located in the ECA or at the ECA preliminary entry point.

Advantageous Effects

According to the present disclosure, a harmful substance reducing device is in a fully heated state which allows normal operations and performs a series of harmful substance reducing functions only for an exhaust gas of an engine (or, a minimum amount of harmful substances of the engine) instantly after a hull initiates ECA sailing. For this reason, a ship operator may flexibly cope with recent harmful substance restrictions without enlarging the scale of the harmful substance reducing device (namely, in a state where the harmful substance reducing device has a small size). In addition, it is possible to easily avoid serious problems caused when harmful substances contained in the exhaust gas are not normally purified due to malfunction of the harmful substance reducing device.

DESCRIPTION OF DRAWINGS

FIG. 1 is a diagram showing an existing harmful substance reducing device.

FIG. 2 is a diagram for illustrating that a ship enters an ECA according to the present disclosure.

FIGS. 3, 8 and 9 are diagrams showing detailed inner configurations of a ship according to the present disclosure.

FIG. 4 is a diagram showing a detailed configuration of an engine output adjusting device according to the present disclosure.

FIG. 5 is a diagram showing a detailed process of the engine output adjusting device according to the present disclosure.

FIG. 6 is a diagram showing a detailed configuration of a harmful substance reducing device preheater according to the present disclosure.

FIG. 7 is a diagram showing a detailed process of the harmful substance reducing device preheater according to the present disclosure.

BEST MODE

Hereinafter, the embodiments of the present disclosure will be described in detail with reference to accompanying drawings.

As shown in FIG. 2, under a series of sailing environments, a ship 300 frequently sails not only in a normal maritime zone N but also in an emission control area (ECA) where discharge of harmful substances is strictly prohibited, according to its sailing purpose.

Under such sailing environments, in the present disclosure, when the ship 300 is located in the normal maritime zone N, a common sailing state (for example, an upward-operation state of an engine 303, or an operation-stopped state of a harmful substance reducing device 100) is suitably maintained. If the ship 300 is located in an ECA or at an ECA preliminary entry point Y1, Y2, <a measure for down-regulating various output factors of an engine 303 in order to minimize an amount of exhaust gas discharged from the corresponding engine 303>, <a measure of preheating the harmful substance reducing device 100 so that the corresponding harmful substance reducing device 100 may function in time (namely, when a hull 300a enters an ECA)> or the like is additionally taken. By doing so, the harmful substance reducing device 100 is in a fully heated state which allows normal operations, and instantly after the hull 300a makes ECA sailing, the corresponding harmful substance reducing device 100 performs a series of harmful substance reducing functions just for a minimum amount of exhaust gas of the engine 303 (or, a minimum amount of harmful substances of the engine 303). Therefore, a ship operator may flexibly cope with recent harmful substance restrictions without enlarging the scale of the harmful substance reducing device 100 (namely, in a state where the harmful substance reducing device 100 has a small size).

For reference, in an existing technique, the engine 303 gives a normal output regardless of whether the ship 300 is in the normal maritime zone N or in the ECA (namely, output factors of the engine are not selectively down-regulated). Therefore, the harmful substance reducing device 100 for reducing harmful substances output from the engine 303 should have a large scale. As a result, a ship operator should bear the above problems caused by a large scale of the harmful substance reducing device 100, for example deteriorated space utilization of the ship 300, impossible overland transportation of the large harmful substance reducing device 100, impossible enlargement of various valves, or the like.

As shown in FIG. 3, the ship 300 according to the present disclosure includes a hull 300a, an engine 303 for propelling the hull 300a; and a harmful substance reducing device 100 for reducing harmful substances contained in an exhaust gas discharged from the engine 303, which are systematically combined.

In this case, the harmful substance reducing device 100, for example a nitrogen oxide reducing device, includes an exhaust gas flow line 112 drawn from the engine 303, a reducing agent storage tank 121 for storing a reducing agent (for example, urea) for reducing harmful substances (for example, nitrogen oxide ($NO_x$), a reducing agent injector 120 connected to the reducing agent storage tank 121 to inject the reducing agent stored in the reducing agent storage tank 121 toward the exhaust gas flow line 112, a compressed air supplier 122 for supplying a compressed air so that the reducing agent injector 120 may perform a series of reducing agent injecting functions, a controller 123 for controlling the compressed air supply valve 124 based on a measurement value output from sensors 119 to adjust an amount of reducing agent injected by the reducing agent injector 120, and a SCR reactor 113 connected to the engine 303 through the exhaust gas flow line 112 to allow an exhaust gas and a reducing agent to pass together so that harmful substances contained in the exhaust gas are purified, which are systematically combined.

At this time, the SCR reactor 113 allows the exhaust gas and the reducing agent to pass simultaneously so that the nitrogen oxide ($NO_x$) reacts with the reducing agent, and is configured so that a SCR catalyst 118 for reducing the corresponding nitrogen oxide ($NO_x$) into nitrogen and steam harmless to living things and a SCR chamber 117 accommodating the SCR catalyst 118 are combined.

Here, on occasions, the exhaust gas flow path switcher 304 disposed on the exhaust gas flow line 112 switches the flow path of the exhaust gas of the engine 303 to an exhaust gas flow line 305 (if purification of the exhaust gas is not required), to an exhaust gas flow line 112 (if purification of the exhaust gas is required), to an exhaust gas flow line 306 (if the exhaust gas is utilized for heating the SCR reactor 113), or the like.

At this time, if the exhaust gas of the engine 303 flows through the exhaust gas flow line 306, the corresponding exhaust gas may flow in a heating box 307 to contact the SCR chamber 117, and be then discharged through an exhaust gas flow line 308, thereby heating the SCR chamber 117, the SCR catalyst 118 or the like over a predetermined temperature (for example, 260° C.).

Meanwhile, under this system of the present disclosure, if an output of the engine 303 increases, the scale of the harmful substance reducing device 100 inevitably increases proportionally, as described above. This is because, if the output of the engine 303 increases, an amount of exhaust gas generated from the corresponding engine 303 also increases greatly.

However, there are many limits in increasing the scale of the harmful substance reducing device 100 in proportion to the output of the engine 303. This is because, if the scale of the harmful substance reducing device 100 increases, various problems such as deteriorated space utilization of the ship 300, impossible overland transportation of the large harmful substance reducing device 100, impossible enlargement of various valves, or the like occur.

Under such a situation, as shown in FIG. 3, in the present disclosure, a measure for additionally disposing <an engine output adjusting device 200 for down-regulating an output of the engine 303 to reduce an amount of exhaust gas discharged from the engine 303 when the hull 300a is located in an ECA where discharge of harmful substances is strictly prohibited or at an ECA preliminary entry point Y2 (see FIG. 2)> may be taken in a communication pipeline such as a hull operating controller 301 taking charge of operating the hull 300a, an engine driving device 302 taking charge of operating the engine 303, or the like (here, the ECA preliminary entry point Y2 may be changed variously depending on features of the ship 300).

In this case, the engine output adjusting device 200 of the present disclosure may be subordinated to a program block of the engine driving device 302 or a program block of the ship operating controller 301, depending on the situation.

At this time, as shown in FIG. 4, the engine output adjusting device 200 according to the present disclosure includes an engine driving device 302, a ship operating controller 301, a global positioning system (GPS) 400, an operation information storing module 202 communicating with a harmful substance sensor 130 (see FIG. 3) or the like attached to a rear end of the SCR chamber 117 of the harmful substance reducing device 100, a hull location acquiring module 203, an ECA-hull relative location determining module 204, an engine output factor adjusting module 205, a purified harmful substance exhaust amount acquiring module 206, an ECA entry determining module 208 or the like, which are closely combined via an interface module 201.

Here, the operation information storing module 202 stores and manages various kinds of operation information required for engine output adjustment service in its information storage area, for example registration information of the engine driving device 302, registration information of the ship operating controller 301, registration information of the GPS 400, registration information of the harmful substance sensor 130, location information (for example, position coordinate information) of the ECA, arrival judgment reference information of the ECA preliminary entry point Y2, reference amount information of purified harmful substances (harmful substances contained in the exhaust gas purified through the harmful substance reducing device 100), down-regulating reference information of each engine output factor, up-regulating reference information of each engine output factor, program component information required for functioning of each computing module, program component information required for connecting and maintaining each communication session of computing modules or the like, so that a series of engine output regulating processes according to the present disclosure may be normally performed without any special problem.

Under a situation where such an infrastructure is provided, as shown in FIG. 5, the hull location acquiring module 203 communicates with the ship operating controller 301, the GPS 400 or the like via the interface module 201 to acquire location information (for example, position coordinate information) of the hull 300a, By doing so, if the location information (for example, position coordinate information) of the hull 300a is completely acquired, the ECA-hull relative location determining module 204 communicates with the hull location acquiring module 203 to read the acquired location information (for example, position coordinate information) of the hull 300a. In addition, the ECA-hull relative location determining module 204 communicates with the operation information storing module 202 to extract the location information (for example, position coordinate information) of the ECA, the arrival judgment reference information of the ECA preliminary entry point Y2 or the like, stored in the information storage area (see FIG. 5).

If the location information (for example, position coordinate information) of the hull 300a, the location information (for example, position coordinate information) of the ECA, the arrival judgment reference information of the ECA preliminary entry point Y2 or the like are completely read and extracted through the above procedure, the ECA-hull relative location determining module 204 performs a series of information comparing routines based on the arrival judgment reference information of the ECA preliminary entry point Y2. The location information (for example, position coordinate information) of the hull 300a is compared with the location information (for example, position coordinate information) of the ECA, and by doing so, it is determined whether the hull 300a is located in the ECA or at the ECA preliminary entry point Y2 (see FIG. 5).

If it is determined that the hull 300a is located in the ECA or at the ECA preliminary entry point Y2 through the above procedure, the engine output factor adjusting module 205 communicates with the ECA-hull relative location determining module 204 to check the corresponding determination result. After that, the engine output factor adjusting module 205 communicates with the operation information storing module 202 to extract down-regulating reference information of each engine output factor, stored in the information storage area (see FIG. 5).

At this time, the engine output factor adopted in the present disclosure may be selected as linear velocity of the hull 300a, revolutions per minute (RPM) of the engine 303, a fuel amount of the engine 303, and an effective pressure of the engine 303.

If the down-regulating reference information of each engine output factor is completely extracted as above, the engine output factor adjusting module 205 performs a series of information generating routines based thereon to take a measure for generating an engine output factor down-regulation request message containing a content of, for example, <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like (see FIG. 5).

While the engine output factor down-regulation request message is generated, the engine output factor adjusting module 205 sets down-regulated linear velocity of the hull 300a, down-regulated RPM of the engine 303, down-regulated fuel amount of the engine 303, down-regulated effective pressure of the engine 303 or the like so that the amount of exhaust gas discharged from the engine 303 is in accordance with the capacity of the harmful substance reducing device 100 (namely, so that the amount of exhaust gas discharged from the engine 303 is within an available harmful substance reducing capacity of the harmful substance reducing device 100), from the time when the hull 300a enters the ECA.

If the engine output factor down-regulation request message containing a content of, for example, <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like is completely generated through the above procedure, the engine output factor adjusting module 205 communicates with the ship operating controller 301, the engine driving device 302 or the like via the interface module 201 to transmit the generated engine output factor down-regulation request message to the ship operating controller 301, the engine driving device 302 or the like (see FIG. 5).

Here, if the engine output factor down-regulation request message containing a content of, for example, <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like is completely received through the above procedure, the ship operating controller 301, the engine driving device 302 or the like reads the corresponding engine output factor down-regulation request message. After that, the ship operating controller 301, the engine driving device 302 or the like performs <a measure of down-regulating linear velocity of the hull 300a from the time when the hull 300a enters the ECA preliminary entry point Y2>, <a measure of down-regulating RPM of the engine 303 from the time when the hull 300a enters the ECA preliminary entry point Y2>, <a measure of down-regulating a fuel amount of the engine 303 from the time when the hull 300a enters the ECA preliminary entry point Y2>, <a measure of down-regulating an effective pressure of the engine 303 from the time when the hull 300a enters the ECA preliminary entry point Y2>, <a measure of down-regulating linear velocity of the hull 300a from the time when the hull 300a enters the ECA>, <a measure of down-regulating RPM of the engine 303 from the time when the hull 300a enters the ECA>, <a measure of down-regulating a fuel amount of the engine 303 from the time when the hull 300a enters the ECA>, <a measure of down-regulating an effective pressure of the engine 303 from the time when the hull 300a enters the ECA>, or the like according to the content. By doing so, the output of the engine 303 is down-regulated, and as a result, at the time when the hull 300a enters the ECA, the amount of exhaust gas discharged from the engine 303 may be naturally reduced according to the capacity of the harmful substance reducing device 100 (namely, the amount of exhaust gas discharged from the engine 303 may be naturally included within an available harmful substance reducing capacity of the harmful substance reducing device 100).

As described above, in the present disclosure, <a computing module capable of down-regulating various output factors of the engine 303 to minimize an amount of exhaust gas discharged from the engine 303 when the ship 300 is located in an ECA where discharge of harmful substances is strictly prohibited or at an ECA preliminary entry point> may be systematically disposed in a communication pipeline such as the hull operating controller 301 taking charge of operating the hull 300a, the engine driving device 302 taking charge of operating the engine 303, or the like. Therefore, under the implementation environment of the present disclosure, instantly after the hull 300a initiates ECA sailing, the harmful substance reducing device 100 may perform a series of harmful substance reducing functions just for a minimum amount of exhaust gas of the engine 303 (or, a minimum amount of harmful substances of the engine 303). Therefore, a ship operator flexibly cope with recent harmful substance restrictions without enlarging the scale of the harmful substance reducing device 100 (namely, in a state where the harmful substance reducing device 100 has a small size).

Meanwhile, as shown in FIG. 4, a purified harmful substance exhaust amount acquiring module 206, an ECA entry determining module 208 or the like is additionally disposed in the engine output adjusting device 200 of the present disclosure in addition to the above computing modules.

At this time, the purified harmful substance exhaust amount acquiring module 206 communicates with the harmful substance sensor 130 or the like attached to a rear end of the SCR chamber 117 of the harmful substance reducing device 100 to acquire an amount of purified harmful substances (harmful substances contained in the exhaust gas purified through the harmful substance reducing device 100) from the harmful substance sensor 130 (see FIG. 5).

If the amount of the purified harmful substances (harmful substances contained in the exhaust gas purified through the harmful substance reducing device 100) is acquired as above, the engine output factor adjusting module 205 communicates with the purified harmful substance exhaust amount acquiring module 206 to read the amount of purified harmful substances. In addition, the engine output factor adjusting module 205 communicates with the operation information storing module 202 to extract reference purified harmful substance amount information stored in the information storage area (see FIG. 5).

If the amount of purified harmful substances, the reference purified harmful substance amount or the like is completely read and extracted through the above procedure, the engine output factor adjusting module 205 performs a series of information comparing routines to compare the amount of purified harmful substances, the reference purified harmful substance amount or the like with each other. By doing so, it is determined whether the amount of purified harmful substances contained in the exhaust gas passing through the harmful substance reducing device 100 exceeds a preset reference purified harmful substance amount (see FIG. 5).

At this time, if it is determined that the amount of purified harmful substances contained in the exhaust gas passing through the harmful substance reducing device 100 exceeds a preset reference purified harmful substance amount, the engine output factor adjusting module 205 communicates with the operation information storing module 202 to extract down-regulating reference information of each engine output factor, stored in the information storage area. After that, based on the extracted result, a series of information generating routines is performed, and for example, a process of generating an engine output factor down-reregulation request message containing a content of <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like is performed (see FIG. 5).

If the engine output factor down-reregulation request message containing a content of <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like is completely generated through the above procedure, the engine output factor adjusting module 205 communicates with the ship operating controller 301, the engine driving device 302 or the like via the interface module 201 to transmit the generated engine output factor down-reregulation request message to the ship operating controller 301, the engine driving device 302 or the like (see FIG. 5).

Here, if the engine output factor down-reregulation request message containing a content of <reduce linear velocity of the hull 300a to SS during AA minutes>, <reduce RPM of the engine 303 to GG during YY minutes>, <reduce a fuel amount of the engine 303 to KK during JJ minutes>, <reduce an effective pressure of the engine 303 to NN during CC minutes> or the like is completely is completely received, the ship operating controller 301, the engine driving device 302 or the like reads the corresponding engine output factor down-reregulation request message and performs <a measure of down-reregulating linear velocity of the hull 300a>, <a measure of down-reregulating RPM of the engine 303>, <a measure of down-reregulating a fuel amount of the engine 303>, <a measure of down-reregulating an effective pressure of the engine 303> or the like according to the content. By doing so, the amount of exhaust gas and harmful substances discharged from the engine 303 may be further reduced, and as a result, the amount of purified harmful substances (namely, the amount of exhaust gas purified through the harmful substance reducing device 100) may also be greatly reduced.

Meanwhile, the ECA entry determining module 208 operating in association with each computing module described above communicates with the hull location acquiring module 203 to read the acquired location information (for example, position coordinate information) of the hull 300a. In addition, the ECA entry determining module 208 communicates with the operation information storing module 202 to extract location information (for example, position coordinate information) of the ECA, stored in the information storage area (see FIG. 5).

If the location information (for example, position coordinate information) of the hull 300a, the location information (for example, position coordinate information) of the ECA or the like is completely read and extracted, the ECA entry determining module 208 performs a series of information comparing routines to compare the location information (for example, position coordinate information) of the hull 300a with the location information (for example, position coordinate information) of the ECA, and by doing so, it is determined whether the hull 300a deviates from the ECA (see FIG. 5).

If it is determined that the hull 300a deviates from the ECA in the above procedure, the engine output factor adjusting module 205 communicates with the ECA entry determining module 208 to check the above, and then communicates with the operation information storing module 202 to extract up-regulating reference information of each engine output factor, stored in the information storage area (see FIG. 5).

If the up-regulating reference information of each engine output factor, stored in the information storage area of the operation information storing module 202, is completely extracted, the engine output factor adjusting module 205 performs a series of information generating routines based thereon to perform a process of generating an engine output factor up-regulation request message having a content such as <increase linear velocity of the hull 300a to SS during AA minutes>, <increase RPM of the engine 303 to GG during YY minutes>, <increase a fuel amount of the engine 303 to KK during JJ minutes>, <increase an effective pressure of the engine 303 to NN during CC minutes> or the like (see FIG. 5).

If the engine output factor up-regulation request message having a content such as <increase linear velocity of the hull 300a to SS during AA minutes>, <increase RPM of the engine 303 to GG during YY minutes>, <increase a fuel amount of the engine 303 to KK during JJ minutes>, <increase an effective pressure of the engine 303 to NN during CC minutes> or the like is completely generated through the above procedure, the engine output factor adjusting module 205 communicates with the ship operating controller 301, the engine driving device 302 or the like via the interface module 201 to transmit the generated engine output factor up-regulation request message to the ship operating controller 301, the engine driving device 302 or the like (see FIG. 5).

Here, if the engine output factor up-regulation request message having a content such as <increase linear velocity of the hull 300a to SS during AA minutes>, <increase RPM of the engine 303 to GG during YY minutes>, <increase a fuel amount of the engine 303 to KK during JJ minutes>, <increase an effective pressure of the engine 303 to NN during CC minutes> or the like is completely received through the above procedure, the ship operating controller 301, the engine driving device 302 or the like reads the corresponding engine output factor up-regulation request message. After that, according to the read content, <a measure of up-regulating linear velocity of the hull 300a>, <a measure of up-reregulating RPM of the engine 303>, <a measure of up-reregulating a fuel amount of the engine 303>, <a measure of up-reregulating an effective pressure of the engine 303> or the like is performed. As a result, the hull 300a deviating from the ECA may rapidly reach a next sailing destination while maintaining up-regulated (normal) linear velocity, in a state where the output of the engine 303 is increased.

Meanwhile, as described above, in the present disclosure, if the ship 300 is located in the ECA or at the ECA preliminary entry point Y2, the amount of exhaust gas discharged from the engine 303 is minimized. By doing so, without increasing the capacity of the harmful substance reducing device 100, instantly after the hull 300a initiates ECA sailing, the harmful substance reducing device 100 may be guided to normally perform a series of harmful substance reducing functions just for a minimum amount of exhaust gas of the engine 303 (or, a minimum amount of harmful substances of the engine 303).

However, in the present disclosure, if the harmful substance reducing device 100 is not in a normal heated state in time (namely, when the hull 300a enters the ECA), a ship operator may not normally purify harmful substances contained in an exhaust gas due to malfunction of the harmful substance reducing device 100 even though the amount of exhaust gas discharged from the engine 303 is minimized.

In this situation, in the present disclosure, as shown in FIG. 3, <a harmful substance reducing device preheater 500 capable of preheating the harmful substance reducing device 100 and thus guiding the harmful substance reducing device 100 to normally operate when the hull 300a is located in an ECA where discharge of harmful substances is strictly prohibited or at an ECA preliminary entry point Y2 (see FIG. 2)> is additionally disposed in a communication pipeline such as the hull operating controller 301 taking charge of operating the hull 300a, the engine driving device 302 taking charge of operating the engine 303, or the like (here, the ECA preliminary entry point Y2 may be changed variously depending on features of the ship 300).

In this case, the harmful substance reducing device preheater 500 of the present disclosure may be subordinated to a program block of the controller 123 or a program block of the ship operating controller 301, depending on the situation.

At this time, as shown in FIG. 6, the harmful substance reducing device preheater 500 according to the present disclosure includes a ship operating controller 301, a global positioning system (GPS) 400, a harmful substance reducing device 100, an operation information storing module 502 communicating with a harmful substance sensor 130 (see FIG. 3) or the like attached to a rear end of the SCR chamber 117 of the harmful substance reducing device 100, a hull location acquiring module 503, an ECA-hull relative location determining module 504, a harmful substance reducing device heating module 505, a purified harmful substance exhaust amount acquiring module 506, a harmful substance additional purification guiding module 507, an ECA entry determining module 508 or the like, which are closely combined via an interface module 201.

Here, the operation information storing module 502 stores and manages various kinds of operation information required for harmful substance reducing device preheating service in its information storage area, for example registration information of the ship operating controller 301, registration information of the GPS 400, registration information of the controller 123 of the harmful substance reducing device 100, registration information of the harmful substance sensor 130, location information (for example, position coordinate information) of the ECA, arrival judgment reference information of the ECA preliminary entry point Y2, reference amount information of purified harmful substances (harmful substances contained in the exhaust gas purified through the harmful substance reducing device 100), preheating reference information of each heat supply unit, reducing agent additional supply reference information, program component information required for connecting and maintaining each communication session of computing modules or the like, so that a series of harmful substance reducing device preheating processes according to the present disclosure may be normally performed without any special problem.

Under a situation where such an infrastructure is provided, as shown in FIG. 7, the hull location acquiring module 503 communicates with the ship operating controller 301, the GPS 400 or the like via the interface module 501 to acquire location information (for example, position coordinate information) of the hull 300a, By doing so, if the location information (for example, position coordinate information) of the hull 300a is completely acquired, the ECA-hull relative location determining module 504 communicates with the hull location acquiring module 503 to read the acquired location information (for example, position coordinate information) of the hull 300a, and also communicates with the operation information storing module 502 to extract the location information (for example, position coordinate information) of the ECA, the arrival judgment reference information of the ECA preliminary entry point Y2 or the like, stored in the information storage area (see FIG. 7).

If the location information (for example, position coordinate information) of the hull 300a, the location information (for example, position coordinate information) of the ECA, the arrival judgment reference information of the ECA preliminary entry point Y2 or the like are completely read and extracted through the above procedure, the ECA-hull relative location determining module 504 performs a series of information comparing routines based on the arrival judgment reference information of the ECA preliminary entry point Y2 to compare the location information (for example, position coordinate information) of the hull 300a with the location information (for example, position coordinate information) of the ECA, and by doing so, it is determined whether the hull 300a is located in the ECA or at the ECA preliminary entry point Y2 (see FIG. 7).

If it is determined that the hull 300a is located in the ECA or at the ECA preliminary entry point Y2 through the above procedure, the harmful substance reducing device heating module 505 communicates with the ECA-hull relative location determining module 504 to check the corresponding determination result. After that, the harmful substance reducing device heating module 505 communicates with the operation information storing module 502 to extract preheating reference information of each heat supply unit, stored in the information storage area (see FIG. 7).

At this time, the heat supply unit may be selected as <an exhaust gas flow path switcher 304 capable of switching a flow path of an exhaust gas discharged from the engine 303 toward the harmful substance reducing device 100 to heat the SCR chamber 117 of the corresponding harmful substance reducing device 100> (depicted in FIG. 3), <a heating air supplier 600 capable of supplying a high-temperature heating air toward the harmful substance reducing device 100 to heat the SCR chamber 117 of the harmful substance reducing device 100> (depicted in FIG. 8), <a heating coil operator 700 capable of supplying electricity toward a heating coil 701 connected to the harmful substance reducing device 100 to heat the SCR chamber 117 of the harmful substance reducing device 100> (depicted in FIG. 9) or the like.

If the preheating reference information of each heat supply unit is extracted as above, the harmful substance reducing device heating module 505 performs a series of information generating routines based thereon to generate a harmful substance reducing device preheating request message having a content of, for example, <switch a flow path of an exhaust gas discharged from the engine 303 to an exhaust gas flow line 306>, <supply a heating air during AA during EE condition>, <operate a heating coil during CC under a BB condition> or the like (see FIG. 7).

If the harmful substance reducing device preheating request message having a content of, for example, <switch a flow path of an exhaust gas discharged from the engine 303 to an exhaust gas flow line 306>, <supply a heating air during AA under an EE condition>, <operate a heating coil during CC under a BB condition> or the like is completely generated through the above procedure, the harmful substance reducing device heating module 505 communicates with the exhaust gas flow path switcher 304, the heating air supplier 600, the heating coil operator 700 or the like via the interface module 501 to transmit the generated harmful substance reducing device preheating request message to the exhaust gas flow path switcher 304, the heating air supplier 600, the heating coil operator 700 or the like (see FIG. 5).

Here, if the harmful substance reducing device preheating request message having a content of <switch a flow path of an exhaust gas discharged from the engine 303 to an exhaust gas flow line 306> is received through the above procedure, as shown in FIG. 3, the exhaust gas flow path switcher 304 allows the exhaust gas of the engine 303 to flow through the exhaust gas flow line 306, so that the corresponding exhaust gas flows in the heating box 307 to contact the SCR chamber 117. After that, the exhaust gas is discharged through the exhaust gas flow line 308 so that the SCR chamber 117, the SCR catalyst 118 or the like are heated over a predetermined temperature (for example, 260° C.). As a result, the harmful substance reducing device 100 is preheated from the ECA preliminary entry point Y2 to give its function normally without any special problem at the time when the hull 300a enters the ECA.

In addition, if the harmful substance reducing device preheating request message having a content of <supply a heating air during AA under an EE condition> is received through the above procedure, as shown in FIG. 8, the heating air supplier 600 takes a measure of supplying a heating air toward the heating box 601, so that the corresponding heating air contacts the SCR chamber 117 inside the heating box 601 to heat the SCR chamber 117, the SCR catalyst 118 or the like over a predetermined temperature (for example, 260° C.). As a result, in this case, the harmful substance reducing device 100 is also preheated from the ECA preliminary entry point Y2 to give its function normally without any special problem at the time when the hull 300a enters the ECA.

Further, if the harmful substance reducing device preheating request message having a content of <operate a heating coil during CC under a BB condition> is received through the above procedure, as shown in FIG. 9, the heating coil operator 700 takes a measure of supplying electric energy toward the heating coil 701, so that the corresponding heating coil contacts the SCR chamber 117 to heat the SCR chamber 117, the SCR catalyst 118 or the like over a predetermined temperature (for example, 260° C.). As a result, in this case, the harmful substance reducing device 100 is also preheated from the ECA preliminary entry point Y2 to give its function normally without any special problem at the time when the hull 300a enters the ECA.

As described above, in the present disclosure, <a computing module for preheating the harmful substance reducing device 100 when the ship 300 is located at the ECA preliminary entry point Y2 so that the corresponding harmful substance reducing device is guided to function normally in time (namely, at the time when the hull 300a enters the ECA)> or the like is systematically arranged in a communication pipeline such as the hull operating controller taking charge of operating the hull, the controller 123 of the harmful substance reducing device 100, or the like. Therefore, under the implementation environment of the present disclosure, instantly after the hull 300a initiates ECA sailing, the harmful substance reducing device 100 may be in a fully heated state which allows normal operations, and instantly after the hull 300a makes ECA sailing, the corresponding harmful substance reducing device 100 may perform a series of harmful substance reducing functions just for a minimum amount of exhaust gas of the engine (or, a minimum amount of harmful substances of the engine). Therefore, a ship operator may easily avoid a serious problem caused when harmful substances contained in the exhaust gas are not normally purified due to malfunction of the harmful substance reducing device 100.

Meanwhile, as shown in FIG. 6, a purified harmful substance exhaust amount acquiring module 506, a harmful substance additional purification guiding module 507, an ECA entry determining module 508 or the like is additionally disposed in the harmful substance reducing device preheater 500 of the present disclosure in addition to the above computing modules.

At this time, the purified harmful substance exhaust amount acquiring module 506 communicates with the harmful substance sensor 130 attached to a rear end of the SCR chamber 117 of the harmful substance reducing device 100 to acquire an amount of purified harmful substances (harmful substances contained in the exhaust gas purified through the harmful substance reducing device 100) from the harmful substance sensor 130 (see FIG. 7).

If the amount of the purified harmful substances (harmful substances contained in the exhaust gas purified through the harmful substance reducing device 100) is acquired as above, the harmful substance additional purification guiding module 507 communicates with the purified harmful substance exhaust amount acquiring module 506 to read the amount of purified harmful substances. In addition, the harmful substance additional purification guiding module 507 communicates with the operation information storing module 502 to extract reference purified harmful substance amount information stored in the information storage area (see FIG. 7).

If the amount of purified harmful substances, the reference purified harmful substance amount or the like is completely read and extracted through the above procedure, the harmful substance additional purification guiding module 507 performs a series of information comparing routines to compare the amount of purified harmful substances, the reference purified harmful substance amount or the like with each other. By doing so, it is determined whether the amount of purified harmful substances contained in the exhaust gas passing through the harmful substance reducing device 100 exceeds a preset reference purified harmful substance amount (see FIG. 7).

At this time, if it is determined that the amount of purified harmful substances contained in the exhaust gas passing through the harmful substance reducing device 100 exceeds a preset reference purified harmful substance amount, the harmful substance additional purification guiding module 507 communicates with the operation information storing module 502 to extract reducing agent additional supply reference information, stored in the information storage area. After that, based on the extracted result, a series of information generating routines is performed, and for example, a process of generating a reducing agent increasing request message containing a content of <increase an amount of the reducing agent as much as FF under an AA condition> is performed (see FIG. 7).

If the reducing agent increasing request message containing a content of <increase an amount of the reducing agent as much as FF under an AA condition> is completely generated through the above procedure, the harmful substance additional purification guiding module 507 communicates with the controller 123 of the harmful substance reducing device 100 via the interface module 501 to transmit the generated reducing agent increasing request message to the controller 123 of the harmful substance reducing device 100 (see FIG. 7).

Here, if the reducing agent increasing request message containing a content of <increase an amount of the reducing agent as much as FF under an AA condition> is completely received, the controller 123 reads the reducing agent increasing request message. After that, the controller performs <a measure of controlling the compressed air supply valve 124 to increase an amount of reducing agent injected by the reducing agent injector 120> according to the content. By doing so, the amount of exhaust gas and harmful substances discharged from the engine 303 may be further purified. As a result, the amount of purified harmful substances (namely, the amount of exhaust gas purified through the harmful substance reducing device 100) may also be greatly reduced.

Meanwhile, the ECA entry determining module 508 operating in association with each computing module described above communicates with the hull location acquiring module 503 to read the acquired location information (for example, position coordinate information) of the hull 300a. In addition, the ECA entry determining module 508 communicates with the operation information storing module 502 to extract location information (for example, position coordinate information) of the ECA, stored in the information storage area (see FIG. 7).

If the location information (for example, position coordinate information) of the hull 300a, the location information (for example, position coordinate information) of the ECA or the like is completely read and extracted, the ECA entry determining module 508 performs a series of information comparing routines. By doing so, the location information (for example, position coordinate information) of the hull 300a is compared with the location information (for example, position coordinate information) of the ECA, and it is determined whether the hull 300a deviates from the ECA (see FIG. 7).

If it is determined that the hull 300a deviates from the ECA in the above procedure, the harmful substance reducing device heating module 505 communicates with the ECA entry determining module 508 to check the above, and then performs a series of information generating routines to take a measure of generating a harmful substance reducing device heating discontinuation request message having a content of <stop a heating process to the harmful substance reducing device 100> (see FIG. 7).

If the harmful substance reducing device heating discontinuation request message having a content of <stop a heating process to the harmful substance reducing device 100> is completely generated, the harmful substance reducing device heating module 505 communicates with the exhaust gas flow path switcher 304, the heating air supplier 600, the heating coil operator 700 or the like via the interface module 501 to transmit the generated harmful substance reducing device heating discontinuation request message to the exhaust gas flow path switcher 304, the heating air supplier 600, the heating coil operator 700 or the like (see FIG. 7).

If the harmful substance reducing device heating discontinuation request message having a content of <stop a heating process to the harmful substance reducing device 100> is completely received, the exhaust gas flow path switcher 304, the heating air supplier 600, the heating coil operator 700 or the like reads the corresponding harmful substance reducing device heating discontinuation request message, and then is converted into a heat supply inactivation state according to the content. By doing so, the supply of exhaust gas/heating air and the supply of heat/electricity to the harmful substance reducing device 100 is stopped, and as a result, a ship operator may easily avoid a problem <the harmful substance reducing device 100 is unnecessarily heated even though the ship 300 deviates from the ECA>.

The present disclosure gives useful effects for various fields where purification of harmful substances is required.

In addition, even though specific embodiments of the present disclosure have been described and illustrated above, it is obvious to those skilled in the art that the present disclosure can be variously modified.

Such modified embodiments should not be understood separate from the present disclosure but should be regarded as falling into the scope of the present disclosure defined by the appended claims.

The invention claimed is:

1. A ship, comprising:
   a hull;
   an engine configured to propelling the hull;
   a harmful substance reducing device configured to reduce harmful substances contained in an exhaust gas discharged from the engine; and
   an engine output adjusting device configured to down-regulating an output of the engine to reduce an amount of exhaust gas discharged from the engine, when the hull is located in an emission control area (ECA) where discharge of harmful substances is prohibited or at an ECA preliminary entry point,
   wherein the engine output adjusting device includes:
      a hull location acquiring module configured to communicate with a global positioning system (GPS) or a hull operating controller for operating the hull to acquire location information of the hull;
      an ECA-hull relative location determining module configured to compare the location information of the hull with stored location information of the ECA to determine whether the hull is located in the ECA or at the ECA preliminary entry point; and
      an engine output factor adjusting module configured to communicate with the hull operating controller or an engine driving device for operating the engine to down-regulate an engine output factor related with the output of the engine so that an amount of exhaust gas discharged from the engine decreases, when the hull is located in the ECA or at the ECA preliminary entry point.

2. The ship according to claim 1,
   wherein the engine output factor adjusting module down-regulates the engine output factor so that an amount of exhaust gas discharged from the engine is adjusted according to a capacity of the harmful substance reducing device.

3. The ship according to claim 2,
   wherein the engine output factor includes any one selected from the group consisting of linear velocity of the hull, revolutions per minute (RPM) of the engine, a fuel amount of the engine, and an effective pressure of the engine.

4. The ship according to claim 1,
   wherein the engine output factor includes any one selected from the group consisting of linear velocity of the hull, revolutions per minute (RPM) of the engine, a fuel amount of the engine, and an effective pressure of the engine.

5. The ship according to claim 1,
   wherein the engine output adjusting device further includes a purified harmful substance exhaust amount acquiring module configured to communicate with a harmful substance sensor attached to the harmful substance reducing device to acquire an amount of purified harmful substances contained in an exhaust gas passing through the harmful substance reducing device,
   wherein the engine output factor adjusting module down-regulates an engine output factor related to the output of the engine again to further reduce an amount of exhaust gas discharged from the engine, when it is determined that an amount of purified harmful substances contained in the exhaust gas passing through the harmful substance reducing device exceeds a preset reference purified harmful substance amount.

6. The ship according to claim 1,
   wherein the engine output adjusting device further includes an ECA entry determining module configured to communicate with the hull location acquiring module, read location information of the hull, then compare the read location information of the hull with stored location information of the ECA, and determine whether the hull deviates from the ECA or not,
   wherein when it is determined that the hull deviates from the ECA, the engine output factor adjusting module up-regulates the engine output factor related with the output of the engine.

7. A ship, comprising:
   a hull;
   an engine configured to propelling the hull;
   a harmful substance reducing device configured to reduce harmful substances contained in an exhaust gas discharged from the engine; and
   an engine output adjusting device configured to down-regulating an output of the engine to reduce an amount of exhaust gas discharged from the engine, when the hull is located in an emission control area (ECA) where discharge of harmful substances is prohibited or at an ECA preliminary entry point,
   wherein the ship further comprises:
      a harmful substance reducing device preheater configured to preheating the harmful substance reducing device when the hull is located at the ECA preliminary entry point adjacent to an ECA where discharge of harmful substances is prohibited.

8. The ship according to claim 7, wherein the harmful substance reducing device preheater includes:
   a hull location acquiring module configured to communicate with a global positioning system (GPS) or a hull operating controller for operating the hull to acquire location information of the hull;

an ECA-hull relative location determining module configured to compare the location information of the hull with stored location information of the ECA to determine whether the hull is located at the ECA preliminary entry point; and a harmful substance reducing device heating module configured to communicate with a heat supply unit connected to the harmful substance reducing device and preheat the harmful substance reducing device, when the hull is located at the ECA preliminary entry point.

9. The ship according to claim 8,
wherein the heat supply unit is an exhaust gas flow path switcher configured to switch a flow path of an exhaust gas discharged from the engine toward the harmful substance reducing device to heat the harmful substance reducing device.

10. The ship according to claim 8,
wherein the heat supply unit is a heating air supplier configured to supply a heating air to the harmful substance reducing device to heat the harmful substance reducing device.

11. The ship according to claim 8,
wherein the heat supply unit is a heating coil operator configured to supply electricity to a heating coil connected to the harmful substance reducing device to heat the harmful substance reducing device.

12. The ship according to claim 8, wherein the harmful substance reducing device preheater includes:

a purified harmful substance exhaust amount acquiring module configured to communicate with a harmful substance sensor attached to the harmful substance reducing device to acquire an amount of purified harmful substances contained in an exhaust gas passing through the harmful substance reducing device; and a harmful substance additional purification guiding module configured to communicate with the harmful substance reducing device to increase an amount of a reducing agent for purifying the harmful substances so that an amount of the purified harmful substances decreases, when it is determined that an amount of purified harmful substances contained in the exhaust gas passing through the harmful substance reducing device exceeds a preset reference purified harmful substance amount.

13. The ship according to claim 8,
wherein the harmful substance reducing device preheater further includes an ECA entry determining module configured to communicate with the hull location acquiring module, read location information of the hull, then compare the read location information of the hull with stored location information of the ECA, and determine whether the hull deviates from the ECA or not, wherein when it is determined that the hull deviates from the ECA, the harmful substance reducing device heating module communicates with the heat supply unit to inactivate the heat supply unit.

14. A method for controlling a ship comprising:
a hull; an engine configured to propelling the hull; a harmful substance reducing device configured to reduce harmful substances contained in an exhaust gas discharged from the engine; and an engine output adjusting device configured to down-regulating an output of the engine to reduce an amount of exhaust gas discharged from the engine, when the hull is located in an emission control area (ECA) where discharge of harmful substances is prohibited or at an ECA preliminary entry point, the method comprising:
acquiring location information of the hull;
comparing the location information of the hull with stored location information of the ECA to determine whether the hull is located in the ECA or at the ECA preliminary entry point; and down-regulating an engine output factor related with an output of the engine to reduce an amount of exhaust gas discharged from the engine, when the hull is located in the ECA or at the ECA preliminary entry point.

15. The method for controlling the ship according to claim 14,
wherein the engine output factor includes any one selected from the group consisting of linear velocity of the hull, revolutions per minute (RPM) of the engine, a fuel amount of the engine, and an effective pressure of the engine.

16. The method for controlling the ship according to claim 14, further comprising:
acquiring an amount of purified harmful substances contained in an exhaust gas passing through the harmful substance reducing device; and down-regulating an engine output factor related to the output of the engine again to further reduce an amount of exhaust gas discharged from the engine, when it is determined that an amount of purified harmful substances contained in the exhaust gas passing through the harmful substance reducing device exceeds a preset reference purified harmful substance amount.

17. The method for controlling the ship according to claim 14, further comprising:
comparing the location information of the hull with stored location information of the ECA to determine whether the hull deviates from the ECA; and up-regulating the engine output factor related to the output of the engine, when it is determined that the hull deviates from the ECA.

18. The method for controlling the ship according to claim 14,
wherein the ship comprises a harmful substance reducing device preheater configured to preheating the harmful substance reducing device when the hull is located at the ECA preliminary entry point adjacent to an ECA where discharge of harmful substances is prohibited, the method further comprising:
preheating the harmful substance reducing device, when the hull is located at the ECA preliminary entry point.

19. The method for controlling the ship according to claim 18, further comprising:
acquiring an amount of purified harmful substances contained in an exhaust gas passing through the harmful substance reducing device; and reducing the amount of the purified harmful substances by increasing an amount of a reducing agent for purifying the harmful substances, when it is determined that the amount of purified harmful substances contained in the exhaust gas passing through the harmful substance reducing device exceeds a preset reference purified harmful substance amount.

* * * * *